(12) United States Patent
Tripathi et al.

(10) Patent No.: US 7,746,783 B1
(45) Date of Patent: Jun. 29, 2010

(54) METHOD AND APPARATUS FOR MONITORING PACKETS AT HIGH DATA RATES

(75) Inventors: Sunay Tripathi, San Jose, CA (US); Nicolas G. Droux, San Jose, CA (US); Cahya Adiansyah Masputra, Millbrae, CA (US)

(73) Assignee: Oracle America, Inc., Redwood City, CA (US)

( * ) Notice: Subject to any disclaimer, the term of this patent is extended or adjusted under 35 U.S.C. 154(b) by 731 days.

(21) Appl. No.: 11/226,790

(22) Filed: Sep. 14, 2005

(51) Int. Cl.
*H04L 12/28* (2006.01)

(52) U.S. Cl. .................. 370/235; 370/230; 370/396; 718/1

(58) Field of Classification Search .............. 370/235, 370/230, 396; 718/1
See application file for complete search history.

(56) References Cited

U.S. PATENT DOCUMENTS

| | | | |
|---|---|---|---|
| 6,041,053 A | 3/2000 | Douceur et al. | |
| 6,070,219 A * | 5/2000 | McAlpine et al. | 710/263 |
| 6,131,163 A | 10/2000 | Wiegel | |
| 6,163,539 A | 12/2000 | Alexander et al. | |
| 6,477,643 B1 | 11/2002 | Vorbach et al. | |
| 6,600,721 B2 | 7/2003 | Edholm | |
| 6,714,960 B1 | 3/2004 | Bitar et al. | |
| 6,757,731 B1 | 6/2004 | Barnes et al. | |
| 6,831,893 B1 * | 12/2004 | Ben Nun et al. | 370/235 |
| 6,859,841 B2 | 2/2005 | Narad et al. | |
| 6,944,168 B2 | 9/2005 | Paatela et al. | |
| 7,046,665 B1 * | 5/2006 | Walrand et al. | 370/392 |
| 7,146,431 B2 | 12/2006 | Hipp et al. | |
| 7,177,311 B1 | 2/2007 | Hussain et al. | |
| 7,260,102 B2 | 8/2007 | Mehrvar et al. | |
| 7,313,142 B2 | 12/2007 | Matsuo et al. | |
| 7,356,818 B2 * | 4/2008 | Carollo et al. | 718/102 |
| 2002/0052972 A1 | 5/2002 | Yim | |
| 2003/0037154 A1 | 2/2003 | Poggio et al. | |
| 2005/0135243 A1 * | 6/2005 | Lee et al. | 370/229 |
| 2005/0138620 A1 | 6/2005 | Lewites | |
| 2006/0005186 A1 * | 1/2006 | Neil | 718/1 |
| 2006/0041667 A1 * | 2/2006 | Ahn et al. | 709/229 |
| 2006/0070066 A1 * | 3/2006 | Grobman | 718/1 |
| 2006/0174324 A1 | 8/2006 | Zur et al. | |
| 2006/0285495 A1 * | 12/2006 | Aitken et al. | 370/235 |
| 2007/0169121 A1 * | 7/2007 | Hunt et al. | 718/1 |
| 2008/0123531 A1 * | 5/2008 | Gerkis | 370/235 |
| 2008/0144635 A1 * | 6/2008 | Carollo et al. | 370/397 |
| 2008/0267140 A1 * | 10/2008 | Lee et al. | 370/337 |

* cited by examiner

*Primary Examiner*—Ricky Ngo
*Assistant Examiner*—Luat Phung
(74) *Attorney, Agent, or Firm*—Osha • Liang LLP (57) ABSTRACT

A method for monitoring communication on a network that includes configuring a classifier using a monitoring profile, receiving a plurality of packets from a network, analyzing each of the plurality of packets by the classifier to determine to which of the plurality of packets satisfies the monitoring profile, forwarding any of the plurality of packets that satisfy the monitoring profile to a first temporary data structure, forwarding any of the plurality of packets that do not satisfy the monitoring profile to a second temporary data structure, requesting a first number of packets from the first temporary data structure by a first virtual serialization queue, wherein the first virtual serialization queue is associated with the first temporary data structure, forwarding the first number of packets to the first virtual serialization queue, and analyzing packets in the first virtual serialization queue by a monitoring program.

15 Claims, 7 Drawing Sheets

METHOD AND APPARATUS FOR MONITORING PACKETS AT HIGH DATA RATES

CROSS-REFERENCE TO RELATED APPLICATIONS

The present application contains subject matter that may be related to the subject matter in the following U.S. applications filed on Apr. 22, 2005, and assigned to the assignee of the present application: "Method and Apparatus for Managing and Accounting for Bandwidth Utilization Within A Computing System" with U.S. application Ser. No. 11/112,367; "Method and Apparatus for Consolidating Available Computing Resources on Different Computing Devices" with U.S. application Ser. No. 11/112,368; "Assigning Higher Priority to Transactions Based on Subscription Level" with U.S. application Ser. No. 11/112,947; "Method and Apparatus for Dynamically Isolating Affected Services Under Denial of Service Attack" with U.S. application Ser. No. 11/112,158; "Method and Apparatus for Improving User Experience for Legitimate Traffic of a Service Impacted by Denial of Service Attack" with U.S. application Ser. No. 11/112,629; "Method and Apparatus for Limiting Denial of Service Attack by Limiting Traffic for Hosts" with U.S. application Ser. No. 11/112, 328; "Hardware-Based Network Interface Per-Ring Resource Accounting" with U.S. application Ser. No. 11/112, 222; "Dynamic Hardware Classification Engine Updating for a Network Interface" with U.S. application Ser. No. 11/112, 934; "Network Interface Card Resource Mapping to Virtual Network Interface Cards" with U.S. application Ser. No. 11/112,063; "Network Interface Decryption and Classification Technique" with U.S. application Ser. No. 11/112,436; "Method and Apparatus for Enforcing Resource Utilization of a Container" with U.S. application Ser. No. 11/112,910; "Method and Apparatus for Enforcing Packet Destination Specific Priority Using Threads" with U.S. application Ser. No. 11/112,584; and "Method and Apparatus for Processing Network Traffic Associated with Specific Protocols" with U.S. application Ser. No. 11/112,228.

BACKGROUND

Network traffic is transmitted from a network, such as the Internet, from a sending system (e.g., a computer system) to a receiving system (e.g., a computer system) via a network interface card (NIC). The NIC is a piece of hardware found in a typical computer system that includes functionality to send and receive network traffic. Typically, network traffic is transmitted in the form of packets, where each packet includes a header and a payload. The header contains information regarding the source address, destination address, size, transport protocol used to transmit the packet, and various other identification information associated with the packet. The payload contains the actual data to be transmitted from the network to the receiving system.

Network traffic may include packets sent from one or more sending systems to one or more receiving systems. It is often desirable to monitor packets exchanged between a specific sending system and a specific receiving system. A host, also connected to the network, is often used to perform the aforementioned monitoring. This host acts as an additional receiving system for all packets exchanged between the original sending and receiving systems.

Each of the packets sent between the sending system and receiving system is typically associated with a connection. The connection ensures that packets from a given process on the sending system reach the appropriate process on the receiving system. Packets received by the receiving system (via a NIC associated with the receiving system) are analyzed by a classifier to determine the connection associated with the packet.

Typically, the classifier includes a connection data structure that includes information about active connections on the receiving system. The connection data structure may include the following information about each active connection: (i) the queue associated with the connection; and (ii) information necessary to process the packets on the queue associated with the connection. Depending on the implementation, the connection data structure may include additional information about each active connection. Such queues are typically implemented as first-in first-out (FIFO) queues and are bound to a specific central processing unit (CPU) on the receiving computer system. Thus, all packets for a given connection are placed in the same queue and are processed by the same CPU. In addition, each queue is typically configured to support multiple connections.

Once the classifier determines the connection associated with the packets, the packets are forwarded to a temporary data structure (e.g., a receive ring on the NIC) and an interrupt is issued to the CPU associated with the queue. In response to the interrupt, a thread associated with the CPU (to which the serialization queue is bound) retrieves the packets from the temporary data structure and places them in the appropriate queue. Once packets are placed in the queue, those packets are processed in due course. In some implementations, the queues are implemented such that only one thread is allowed to access a given queue at any given time.

SUMMARY

In general, in one aspect, the invention relates to a method for monitoring communication on a network comprising configuring a classifier using a monitoring profile, receiving a plurality of packets from a network, analyzing each of the plurality of packets by the classifier to determine to which of the plurality of packets satisfies the monitoring profile, forwarding any of the plurality of packets that satisfy the monitoring profile to a first temporary data structure, forwarding any of the plurality of packets that do not satisfy the monitoring profile to a second temporary data structure, requesting a first number of packets from the first temporary data structure by a first virtual serialization queue, wherein the first virtual serialization queue is associated with the first temporary data structure, forwarding the first number of packets to the first virtual serialization queue, and analyzing packets in the first virtual serialization queue by a monitoring program.

In general, in one aspect, the invention relates to a system, comprising a network interface configured to receive a plurality of packets from a network, a classifier operatively connected to the network interface configured to analyze each of the plurality of packets using a monitoring profile and determine to which of a plurality of temporary data structures each of the plurality of packet is forwarded, a first one of the plurality of temporary data structures configured to receive packets from the classifier that satisfy the monitoring profile, wherein the first of the plurality of temporary data structures is associated with a first virtual serialization queue, a second one of the plurality of temporary data structures configured to receive packets from the classifier that do not satisfy the monitoring profile, wherein the second of the plurality of temporary data structures is associated with a second virtual serialization queue, the first virtual serialization queue configured to retrieve and queue a first number of packets from the first one of the plurality of temporary data structures, and a monitoring application associated with the first one virtual serialization queue configured to pull packets from the first virtual serialization queue for analysis.

In general, in one aspect, the invention relates to a computer readable medium containing software instructions for monitoring communication on a network, wherein the software instructions comprise functionality to configure a classifier using a monitoring profile, receive a plurality of packets from a network, analyze each of the plurality of packets by the classifier to determine to which of the plurality of packets satisfies the monitoring profile, forward any of the plurality of packets that satisfy the monitoring profile to a first temporary data structure, forward any of the plurality of packets that do not satisfy the monitoring profile to a second temporary data structure, request a first number of packets from the first temporary data structure by a first virtual serialization queue, wherein the first virtual serialization queue is associated with the first temporary data structure, forward the first number of packets to the first virtual serialization queue, and analyze packets in the first virtual serialization queue by a monitoring program.

Other aspects of the invention will be apparent from the following description and the appended claims.

DETAILED DESCRIPTION

Exemplary embodiments of the invention will be described with reference to the accompanying drawings. Like items in the drawings are shown with the same reference numbers.

In an embodiment of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to a method and apparatus for monitoring packets on a network. More specifically, embodiments of the invention relate to a method and apparatus for monitoring packets on a network exchanged between a specific sending and receiving system, where the packets are sent at high data rates (e.g., 10 Mega bits per second (Mbps)).

Figure 1A:
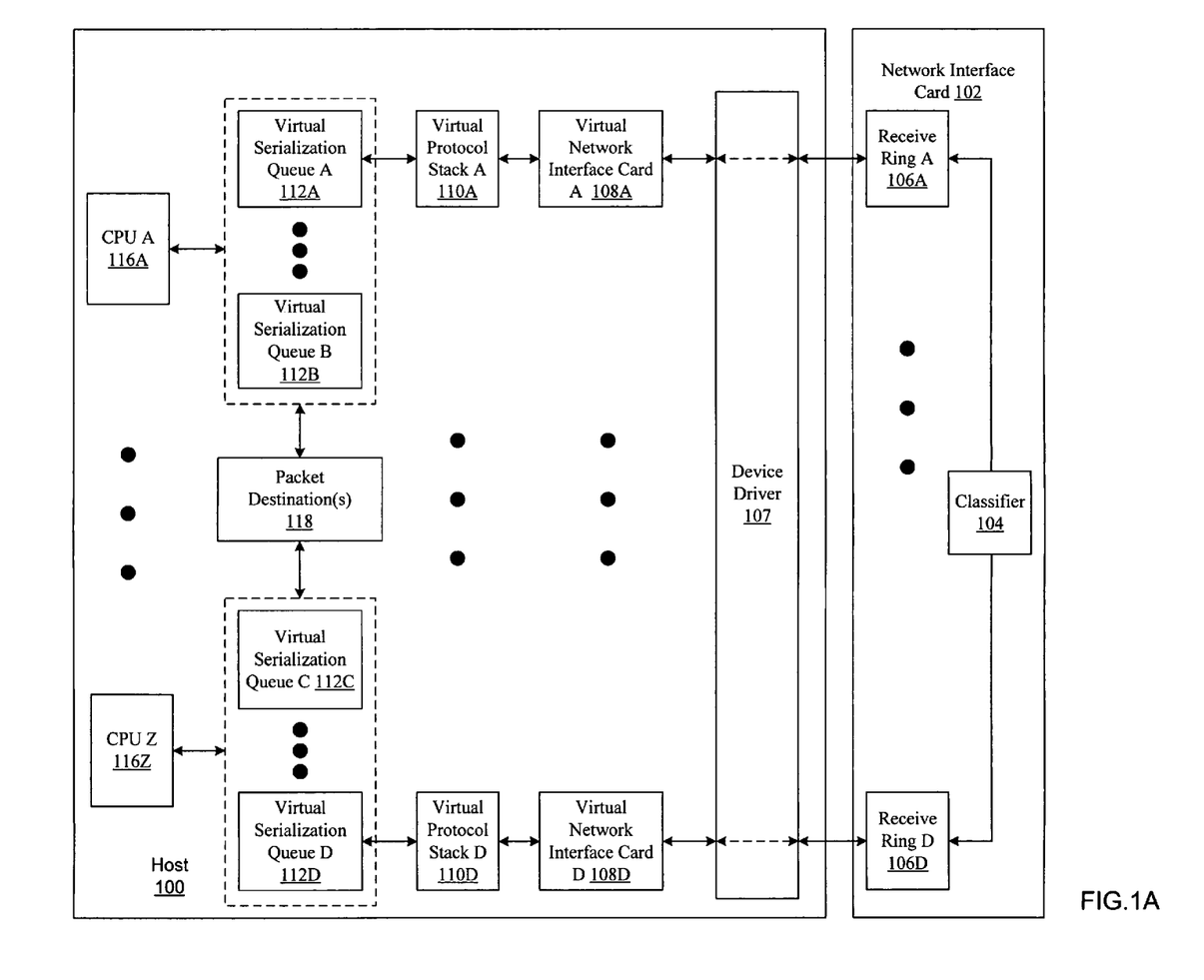
FIGS. 1A and 1B show a system in accordance with one embodiment of the invention.

FIG. 1A shows a system in accordance with one embodiment of the invention. As shown in FIG. 1A, the system includes a host (100) operatively connected to a NIC (102). The NIC (102) provides an interface between the host (100) and a network (not shown) (e.g., a local area network, a wide area network, a wireless network, etc.). More specifically, the NIC (102) includes a network interface (NI) (i.e., the hardware on the NIC used to interface with the network). For example, the NI may correspond to an RJ-45 connector, a wireless antenna, etc. The packets received by the NI are then forwarded to other components on the NIC (102) for processing. In one embodiment of the invention, the NIC (102) includes a classifier (104) and one or more receive rings (106A, 106D). In one embodiment of the invention, the receive rings (106A, 106D) correspond to portions of memory within the NIC (102) used to temporarily store the received packets. Further, in one embodiment of the invention, a ring element of the receive rings (106A, 106D) may point to host memory. In one embodiment of the invention, the classifier (104) is configured to analyze the incoming network traffic, typically in the form of packets, received from the network (not shown).

In one embodiment of the invention, analyzing individual packets includes determining to which of the receive rings (106A, 106D) each packet is forwarded. In one embodiment of the invention, at least one receiver ring (106A, 106D) is configured to store the packets that satisfy a monitoring profile. In one embodiment of the invention, the monitoring profile corresponds to the network traffic that the monitoring application is monitoring. The monitoring profile may specify a sending system (i.e., the system from which the network traffic originated), a receiving system (i.e., the system to which the network traffic is destined), a set of sending systems, a set of receiving systems, or any combination thereof. The monitoring profile may also specify a type of network or packet traffic to monitor (e.g., IP, UDP, etc.). Those skilled in the art will appreciate that the monitoring application may specify multiple monitoring profiles (e.g., the monitoring application may specify all packets sent from system A and all packets sent between systems B and C using IP).

In one embodiment of the invention, analyzing the packets by the classifier (104) includes analyzing one or more fields in each of the packets to determine to which of the receive rings (106A, 106D) the packets are forwarded. As an alternative, the classifier (104) may use the contents of one or more fields in each packet as an index into a data structure that includes information necessary to determine to which receive ring (106A, 106D) that packet is forwarded. The classifier (104) may be implemented entirely in hardware (i.e., the classifier (104) may be a separate microprocessor embedded on the NIC (102)). Alternatively, the classifier (104) may be implemented in software stored in memory (e.g., firmware, etc.) on the NIC and executed by a microprocessor on the NIC (102). Those skilled in the art will appreciate that classifier (104) may be configured to separate packets based on the aforementioned monitoring profile.

In one embodiment of the invention, the host (100) may include the following components: a device driver (107), one or more virtual NICs (108A, 108D), one or more virtual protocol stacks (110A, 110D), one or more virtual serialization queues (112A, 112B, 112C, 112D), one or more CPUs (116A, 116Z), and one or more packet destinations (118) (e.g., containers and/or services). In one embodiment of the invention, the device driver (107) provides an interface between the receive rings (106A, 106D) and the host (100). More specifically, the device driver (107) exposes the receive rings (106A, 106D) to the host (100). In one embodiment of the invention, each of the virtual NICs (108A, 108D) is associated with one or more receive rings (106A, 106D,). The virtual NICs (108A, 108D) provide an abstraction layer between the NIC (102) and the various packet destinations (118) (e.g., containers and/or services) executing on the host (100). More specifically, each virtual NIC (108A, 108D) operates like a NIC (100). For example, in one embodiment of the invention, each virtual NIC (108A, 108D) is associated with one or more Internet Protocol (IP) addresses, one or more ports, and configured to handle one or more protocol types. Thus, while the host (100) may be operatively connected to a single NIC (102), packet destinations (118) (e.g., containers and/or services) executing on the host (100)) operate as if the host (100) is bound to multiple NICs.

Each of the virtual NICs (108A, 108D) is operatively connected to a corresponding virtual protocol stack (110A, 110D). In one embodiment of the invention, each virtual protocol stack (110A, 110D) includes functionality to process packets in accordance with various protocols used to send and receive packets (e.g., Transmission Communication Protocol (TCP), Internet Protocol (IP), User Datagram Protocol (UDP), etc.). Further, each virtual protocol stack (110A, 110D) may also include functionality, as needed, to perform additional processing on the incoming and outgoing packets. This additional processing may include, but is not limited to, cryptographic processing, firewall routing, etc.

In one embodiment of the invention, each virtual protocol stack (110A, 110D) includes network layer and transport layer functionality. In one embodiment of the invention, network layer functionality corresponds to functionality to manage packet addressing and delivery on a network (e.g., functionality to support IP, Address Resolution Protocol (ARP), Internet Control Message Protocol, etc.). In one embodiment of the invention, transport layer functionality corresponds to functionality to manage the transfer of packets on the network (e.g., functionality to support TCP, UDP, Stream Control Transmission Protocol (SCTP), etc.).

In one embodiment of the invention, each virtual protocol stack (e.g., Virtual Protocol Stack A (110A), Virtual Protocol Stack D (110D)) is associated with a virtual serialization queue (e.g., Virtual Serialization Queue A (112A), Virtual Serialization Queue A (112D), respectively). In one embodiment of the invention, each virtual serialization queue (112A, 112B, 112C, 112D) corresponds to a data structure having at least two queues, an inbound queue and an outbound queue. Each of the queues within the virtual serialization queues (112A, 112B, 112C, 112D) are typically implemented as first-in first-out (FIFO) queues. Further, each virtual serialization queue (112A, 112B, 112C, 112D) is configured to send and receive packets from an associated virtual NIC (108A, 108D) via an associated virtual protocol stack (110A, 110D). In addition, each virtual serialization queue (112A, 112B, 112C, 112D) is configured to send and receive packets from one or more associated packet destinations (118) (e.g., containers and/or services). The structure of the virtual serialization queue (112A, 112B, 112C, 112D) is discussed below in detail and shown in FIG. 3.

As discussed above, the host (100) may include one or more CPUs (116A, 116Z). Further, each virtual serialization queue (112A, 112B, 112C, 112D) is bound to one of the CPUs (116A, 116Z). As shown in FIG. 1A, a pair of virtual serialization queues (e.g., Virtual Serialization Queue A (112A) and Virtual Serialization Queue B (112B)) is bound to one CPU (e.g., CPU A (116A)). Although FIG. 1 shows a pair of virtual serialization queues bound to a single CPU, those skilled in the art will appreciate that any number of virtual serialization queues may be bound to a CPU.

As discussed above, the host (100) includes one or more packet destinations (118) (e.g., containers and/or services). In one embodiment of the invention, the packet destination(s) (118) (e.g., containers and/or services) corresponds to any process or group of processes executing on the host that sends and receives network traffic. Examples of packet destinations (118) include, but are not limited to, containers, services (e.g., web server), etc. In one embodiment of the invention, a packet destination (118) includes or corresponds to a monitoring application. In one embodiment of the invention, the monitoring application corresponds to any application (or process) that includes functionality to monitor network traffic. Further, the monitoring application may include functionality to enable the user to specify one or more monitoring profiles. In addition, the monitoring application may include functionality to configure the classifier (e.g., 104 in FIG. 1A) as well as other portions of the host (100) to implement the monitoring profiles.

Figure 1B:
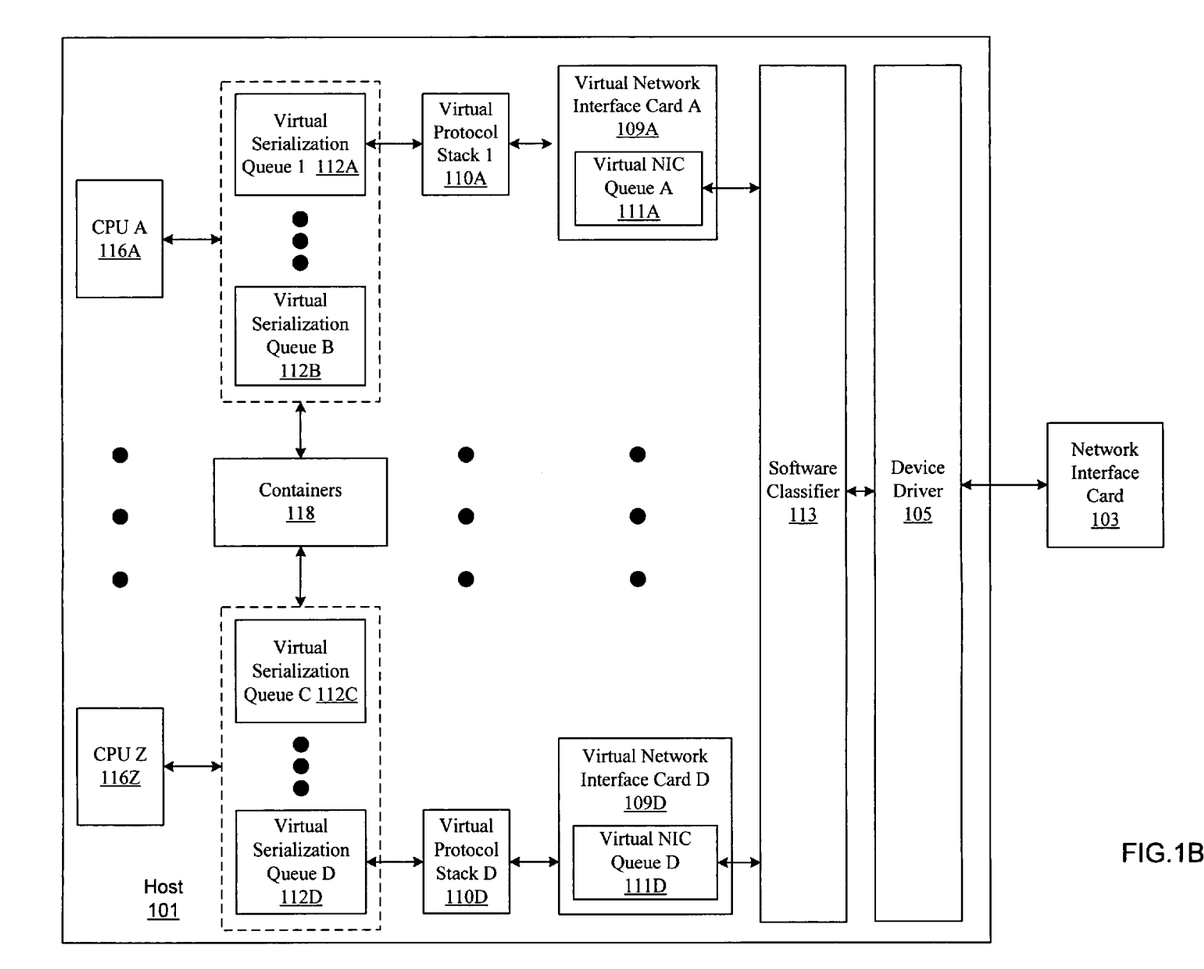

FIG. 1B shows a system in accordance with another embodiment of the invention. As shown in FIG. 1B, the system includes a host (101) operatively connected to a NIC (103). The NIC (103) provides an interface between the host (101) and a network (not shown) (e.g., a local area network, a wide area network, a wireless network, etc.). More specifically, the NIC (102) includes an NI (i.e., the hardware on the NIC used to interface with the network). For example, the NI may correspond to an RJ-45 connector, a wireless antenna, etc. The packets received by the NI are then forwarded to other components on the NIC (103) for processing, etc.

In one embodiment of the invention, the host (101) may include the following components: a device driver (105), a software classifier (113), one or more virtual NICs (109A, 109D), one or more virtual protocol stacks (110A, 110D), one or more virtual serialization queues (112A, 112B, 112C, 112D), one or more CPUs (116A, 116Z), and one packet destination (118) (e.g., containers and/or services). In one embodiment of the invention, the software classifier (113) is configured to analyze the incoming network traffic, typically in the form of packets, received from the network (not shown).

In one embodiment of the invention, the purpose of classifying the packets is to determine to which of the virtual NIC queues (111A, 111D) each of the packets is forwarded. In one embodiment of the present invention, at least one virtual NIC queue (111A, 111D) is configured to store packets that satisfy the monitoring profile (described above).

Continuing with the discussion of FIG. 1B, in one embodiment of the invention, the virtual NIC queues (111A, 111D) correspond to portions of memory (e.g., buffers) within the host (101) used to temporarily store packets. In one embodiment of the invention, analyzing the packets by the software classifier (113) includes analyzing one or more fields in the packet to determine to which of the virtual NIC queues (111A, 111D) each of the packets is forwarded. As an alternative, the software classifier (113) may use the contents of one or more fields in each packet as an index into a data structure that includes information necessary to determine which virtual NIC queue (111A, 111D) each of the packets is forwarded.

As shown in FIG. 1B, the device driver (105) is operatively connected to the software classifier (113) and provides an interface between the NIC (103) and the host (101). In one embodiment of the invention, each of the virtual NICs (109A, 109D) includes one or more virtual NIC queues (111A, 111D). The virtual NICs (109A, 109D) provide an abstraction layer between the NIC (103) and the various packet destinations (118) (e.g., containers and/or services) executing on the host (101). More specifically, each virtual NIC (109A, 109D) operates like a NIC (101). For example, in one embodiment of the invention, each virtual NIC (109A, 109D) is associated with one or more Internet Protocol (IP) addresses, one or more ports, and configured to handle one or more protocol types. Thus, while the host (101) may be operatively connected to a single NIC (103), the host (101) (or more specifically, packet destinations (118) (e.g., containers and/or services) (at both the kernel level and the user-level) executing on the host (101)) operate as if the host (101) is bound to multiple NICs.

Each of the virtual NICs (109A, 109D) is operatively connected to a corresponding virtual protocol stack (110A, 110D). In one embodiment of the invention, each virtual protocol stack (110A, 110D) includes functionality to process packets in accordance with various protocols used to send and receive packets (e.g., TCP, IP, UDP, etc.). Further, each virtual protocol stack (110A, 110D) may also include functionality, as needed, to perform additional processing on the incoming and outgoing packets. This additional processing may include, but is not limited to, cryptographic processing, firewall routing, etc.

In one embodiment of the invention, each virtual protocol stack (110A, 110D) includes network layer and transport layer functionality. In one embodiment of the invention, network layer functionality corresponds to functionality to manage packet addressing and delivery on a network (e.g., functionality to support ARP, Internet Control Message Protocol, etc.). In one embodiment of the invention, transport layer functionality corresponds to functionality to manage the transfer of packets on the network (e.g., functionality to support TCP, UDP, SCTP, etc.).

In one embodiment of the invention, each virtual protocol stack (e.g., Virtual Protocol Stack A (110A), Virtual Protocol Stack D (110D)) is associated with a virtual serialization queue (e.g., Virtual Serialization Queue A (112A), Virtual Serialization Queue A (112D), respectively). In one embodiment of the invention, each virtual serialization queue (112A, 112B, 112C, 112D) corresponds to a data structure having at least two queues, an inbound queue and an outbound queue. Each of the queues within the virtual serialization queues (112A, 112B, 112C, 112D) are typically implemented as first-in first-out (FIFO) queues. Further, each virtual serialization queue (112A, 112B, 112C, 112D) is configured to send and receive packets from associated virtual NICs (109A, 109D) via an associated virtual protocol stack (110A, 110D). In addition, each virtual serialization queue (112A, 112B, 112C, 112D) is configured to send and receive packets from one or more associated packet destinations (118) (e.g., containers and/or services). The structure of the virtual serialization queue (112A, 112B, 112C, 112D) is discussed below in detail and shown in FIG. 3. As discussed above, the host (101) may include one or more CPUs (116A, 116Z). Further, each virtual serialization queue (112A, 112B, 112C, 112D) is bound to one of the CPUs (116A, 116Z). As shown in FIG. 1B, a pair of virtual serialization queues (e.g., Virtual Serialization Queue A (112A) and Virtual Serialization Queue B (112B)) is bound to one CPU (e.g., CPU A (116A)). Although FIG. 1B shows a pair of virtual serialization queues bound to a single CPU, those skilled in the art will appreciate that any number of virtual serialization queues may be bound to a CPU.

As discussed above, the host (101) includes one or more packet destinations (118) (e.g., containers and/or services). In one embodiment of the invention, the packet destination(s) (118) (e.g., containers and/or services) corresponds to any process or group of processes executing on the host that sends and receives network traffic. Examples of packet destinations (118) include, but are not limited to, containers, services (e.g., web server, a monitoring application, etc.), etc. In one embodiment of the invention, each packet destination (118) (e.g., containers and/or services) may be associated with one or more virtual serialization queues (112A, 112B, 112C, 112D).

Figure 2:
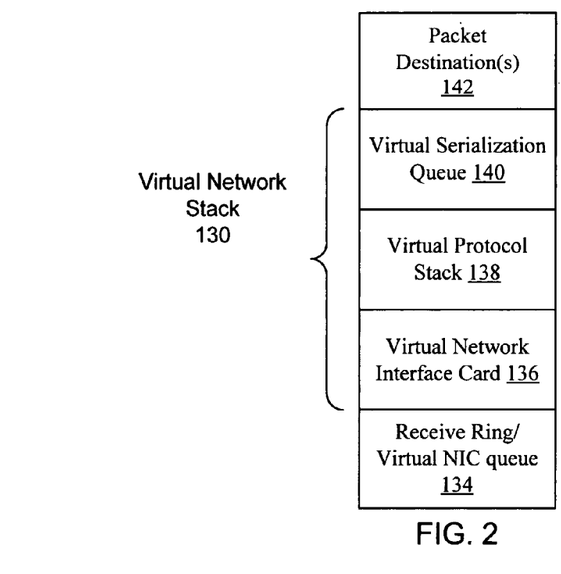
FIG. 2 shows a virtual network stack in accordance with one embodiment of the invention.

In one embodiment of the invention, the receive rings and the virtual NIC queues may be generally referred to as temporary data structures. Further, in one embodiment of the invention, a system, as shown in FIGS. 1 and 2, may include multiple hosts (such as host (100) in FIG. 1 and host (101) in FIG. 2) where each host is operatively connected to one or more NICs. In one embodiment of the invention, each of the NICs may correspond to the NIC shown in FIG. 1 (i.e., NIC (102)) or the NIC shown in FIG. 1B (i.e., NIC (103)). Thus, in a given system, one host may include a software classifier while another host may be connected to a NIC with a hardware classifier. In this scenario, the host would be configured to support both implementations, as described above with in FIGS. 1A and 1B.

Those skilled in the art will appreciate that the receive rings (106A, 106D) and the virtual NIC queues (111A, 111D) are typically configured to store a limited number of packets. Further, once the receive rings (106A, 106D) and the virtual NIC queues (111A, 111D) are "full" (i.e., the receive rings (106A, 106D) and the virtual NIC queues (111A, 111D) cannot store any additional packets), then the packets received after this point are dropped (i.e., the are not stored in the receive rings (106A, 106D) or the virtual NIC queues (111A, 111D). Further, those skilled in the art will appreciate that the receive rings (106A, 106D) and the virtual NIC queues (111A, 111D) become "full" when the rate at which the packets are received by the receive rings (106A, 106D) and the virtual NIC queues (111A, 111D) is greater than the rate at which the packets are removed from the receive rings (106A, 106D) and the virtual NIC queues (111A, 111D) by the corresponding virtual serialization queues (112A, 112B, 112C, 112D).

FIG. 2 shows a virtual network stack in accordance with one embodiment of the invention. Various components described above in FIG. 1A and FIG. 1B may be collectively referred to as a virtual network stack (130). In one embodiment of the invention, the virtual network stack (130) includes a virtual NIC (136), a virtual protocol stack (138), and a virtual serialization queue (140). In one embodiment of the invention, the virtual network stack (130) may be bound to one or more receive rings or virtual NIC interfaces (134) (depending on the implementation). Further, the virtual network stack (130) may be bound to one or more packet destinations (142) (e.g., containers and/or services). All of the aforementioned components in the virtual network stack (130) are bound together such that a packet received by the virtual NIC (136) of a particular virtual network stack (130) is forwarded through the other components of the virtual network stack (130) until the packet reaches the packet destination (142) (e.g., containers and/or services) associated with the particular virtual network stack (130). In one embodiment of the invention, the host includes multiple virtual network stacks (130) each of which includes a virtual NIC (136), a virtual protocol stack (138), and a virtual serialization queue (140).

Figure 3:
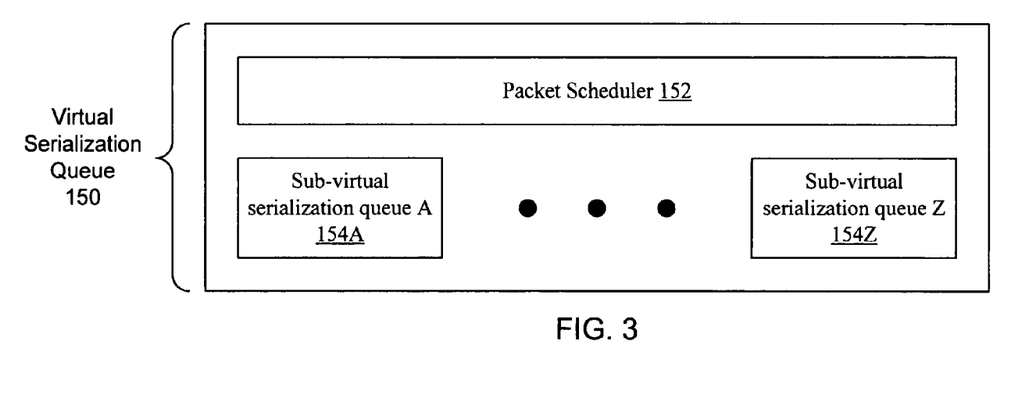
FIG. 3 shows a virtual serialization queue in accordance with one embodiment of the invention.

FIG. 3 shows a virtual serialization queue in accordance with one embodiment of the invention. In one embodiment of the invention, the virtual serialization queue (150) includes a packet scheduler (152) and one or more sub-virtual serialization queues (154A, 154Z). In one embodiment of the invention, each sub-virtual serialization queue (154A, 154Z) may be configured to queue specific types of packets. For example, the sub-virtual serialization queues (154A, 154Z) may be configured to queue received packets based on the protocol (e.g., IP Security Protocol (IPsec), TCP, IP, UDP, etc.) used to send the packet. Those skilled in the art will appreciate that each sub-virtual serialization queue (154A, 154Z) may be configured to queue any specified subset of packets. In one embodiment of the invention, if the virtual serialization queue (150) includes one or more sub-virtual serialization queues (154A, 154Z), then each of the sub-virtual serialization queues (154A, 154Z) is bound to the same CPU and associated with the same virtual network stack. Further, if the virtual serialization queue (150) includes one or more sub-virtual serialization queues (154A, 154Z), then the virtual network stack associated with the sub-virtual serialization queues (154A, 154Z) is also associated with a corresponding number of receive rings and/or virtual NIC queues (depending on the implementation). Thus, each of the sub-virtual serialization queues (154A, 154Z) are bound to one of the aforementioned receive rings and/or virtual NIC queues (depending on the implementation). Thus, when the virtual serialization queue (150) receives packets from one or more associated receive rings or a virtual NIC queues (not shown) (depending on the implementation) via the associated virtual network stack, the virtual serialization queue (150) places the packets in the appropriate sub-virtual serialization queue (154A, 154Z) based on which receive ring or virtual NIC queue the packets were received from. In one embodiment of the invention, each of the sub-virtual serialization queues (154A, 154Z) includes a pair of FIFO queues, namely an inbound queue and an outbound queue.

Those skilled in the art will appreciate that a virtual serialization queue (150) does not necessarily include any sub-virtual serialization queues (154A, 154Z). If the virtual serialization queue (150) does not include any sub-virtual serialization queues (154A, 154Z), then the virtual serialization queue (150) may include only a single pair of queues.

In one embodiment of the invention, the packet scheduler (152) is configured to process the packets stored in each of the sub-virtual serialization queues (154A, 154Z). More specifically, the packet scheduler (152) schedules how packets queued in the various sub-virtual serialization queues (154A, 154Z) are to be processed (i.e., the order of processing of those packets, etc.). In one embodiment of the invention, the packet scheduler (150) may include functionality to support both fair-share scheduling and time-sharing scheduling with respect to processing of the packets queued on the sub-virtual serialization queues (154A, 154Z). Further, the packet scheduler (150) may also be configured to schedule packet processing based on the priority associated with each of the sub-virtual serialization queues (154A, 154Z).

Figure 4:
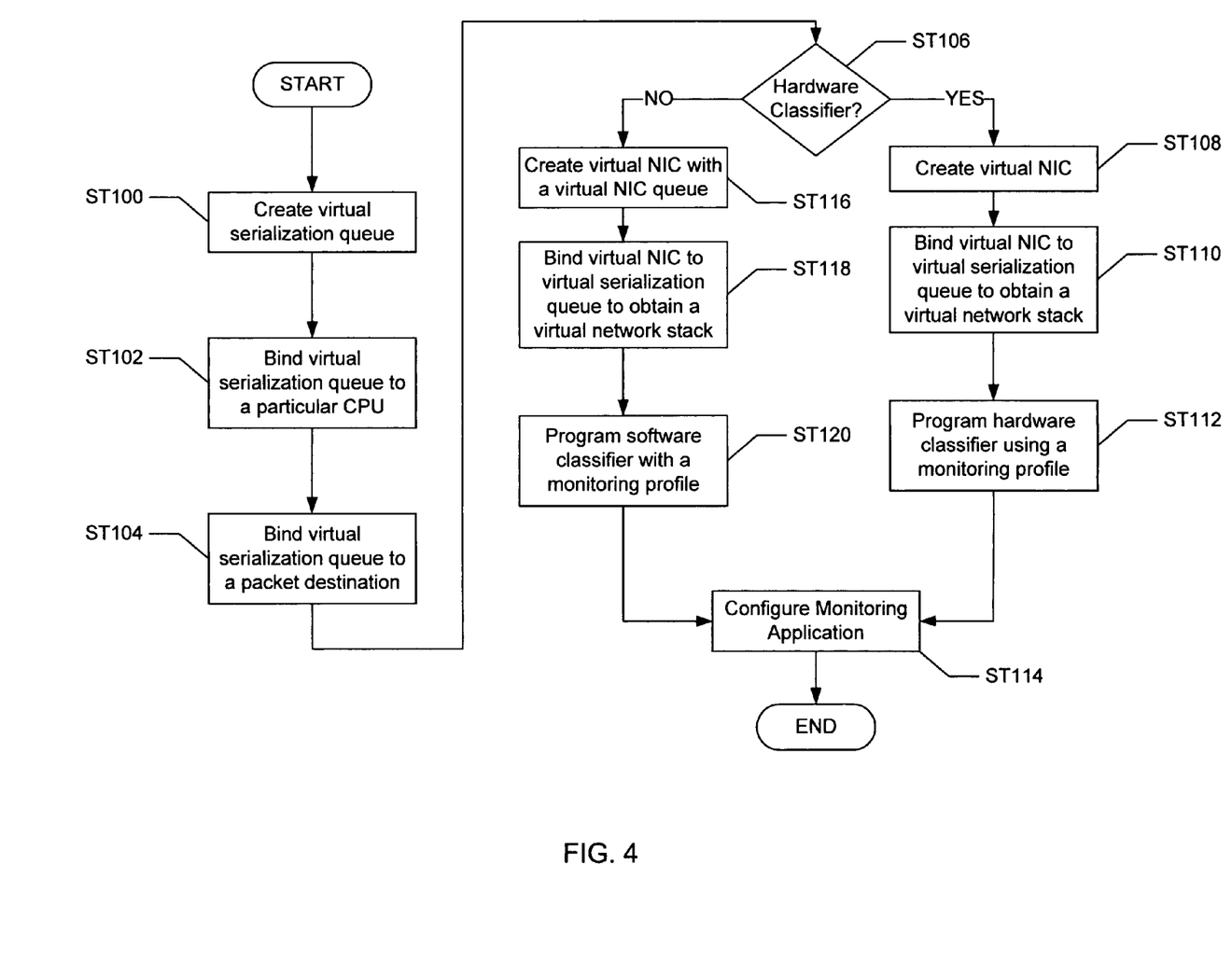
FIG. 4 shows a flowchart in accordance with one embodiment of the invention.

FIG. 4 shows a flowchart in accordance with one embodiment of the invention. Initially, a virtual serialization queue is created (ST100). In one embodiment of the invention, creating the virtual serialization queue may include specifying one or more sub-virtual serialization queues and configuring the packet scheduler. The virtual serialization queue is subsequently bound to a CPU on the host (ST102). Those skilled in the art will appreciate that the virtual serialization queue created in ST100 may be implicitly bound to a CPU upon creation.

At this stage, the virtual serialization queue is bound to a packet destination (e.g., containers and/or services) (ST104). Those of ordinary skill in the art will appreciate that the packet destination (118) (e.g., a monitoring application) may be bound to the virtual serialization queue any time after the virtual serialization queue has been created.

Continuing with the discussion in FIG. 4, a determination is then made as to whether a NIC associated with the host includes a hardware classifier (ST106). If the NIC includes a hardware classifier, then a virtual NIC is created (ST108) and bound to the virtual serialization queue created in ST100 to obtain a virtual network stack (ST110). The hardware classifier is subsequently programmed such that network traffic for the virtual network stack created in ST110 is directed to a particular receive ring by the hardware classifier based on a monitoring profile (ST112). Those skilled in the art will appreciate that the monitoring profile may correspond to a pre-configured monitoring profile or may be customized by the user. Further, the monitoring profile may be created or obtained at anytime prior to programming the hardware classifier.

In one embodiment of the invention, at least one receiver ring is designated to temporarily store packets that satisfy the monitoring profile that are obtained from the network being monitored. In one embodiment of the invention, the hardware classifier is programmed by the monitoring application. In one embodiment of the invention, programming the hardware classifier may correspond to specifying which receive ring to place packets that satisfy the monitoring profile. Those skilled in the art will appreciate that if the monitoring application specifies multiple monitoring profiles, then each monitoring profile may be assigned to a different receive ring. Alternatively, each monitoring profile may be assigned to the same receive ring or various monitoring profiles may be group together and each of the groups may be assigned to a separate receive ring.

Continuing with the discussion of FIG. 4, in ST114, the monitoring application is configured to monitor packets placed in the virtual network stack specified in ST112. Those skilled in the art will appreciate that configuring the monitoring application may include specifying from which virtual serialization queue(s) the monitoring application should obtain packets.

Continuing the discussion of FIG. 4, if the NIC does not include a hardware classifier (i.e., the scenario in which the host includes a NIC having a software classifier), then a virtual NIC with a virtual NIC queue is created (ST116) and bound to the virtual serialization queue created in ST100 to obtain a virtual network stack (ST118). The software classifier is then programmed such that the network traffic for the virtual network stack created in ST110 is directed to a particular virtual NIC queue by the software classifier based on the monitoring profile (ST120).

In one embodiment of the invention, one or more virtual NIC queues are configured in the same manner as the receive rings described above. The method then proceeds to ST114.

Those skilled in the art will appreciate that the steps shown in FIG. 4 may be repeated as required to create any number of virtual network stacks. Once the virtual network stack(s) has been created, as described above, the host may proceed to receive packets from the network. Those skilled in the art will appreciate that the number of virtual network stacks created using the steps shown in FIG. 4 may vary based on the available system resources (e.g., number of CPUs, type of NIC, etc.). Those skilled in the art will also appreciate that the monitoring application described and shown in FIG. 4 may only be configured to monitor packets from a selected group of virtual serialization queues.

In one embodiment of the invention, when the hardware or software classifiers are being programmed, the virtual serialization queues associated with the monitoring application (i.e., the virtual serialization queues that the monitoring application is configured to obtain packets from) are set at a high priority, while the virtual serialization queues not associated with the monitoring application are set a low priority. In one embodiment of the invention, setting a virtual serialization queue at a specific priority (high, low, etc.) defines the order in which the packets are processed off of the various serialization queues as well as the frequency with which packets are requested from the receive rings or virtual NIC queues associated with the virtual serialization queues. Those skilled in the art will appreciate that the terms "high" and "low" are intended to convey a relative priority as opposed to an absolute priority.

Figure 5:
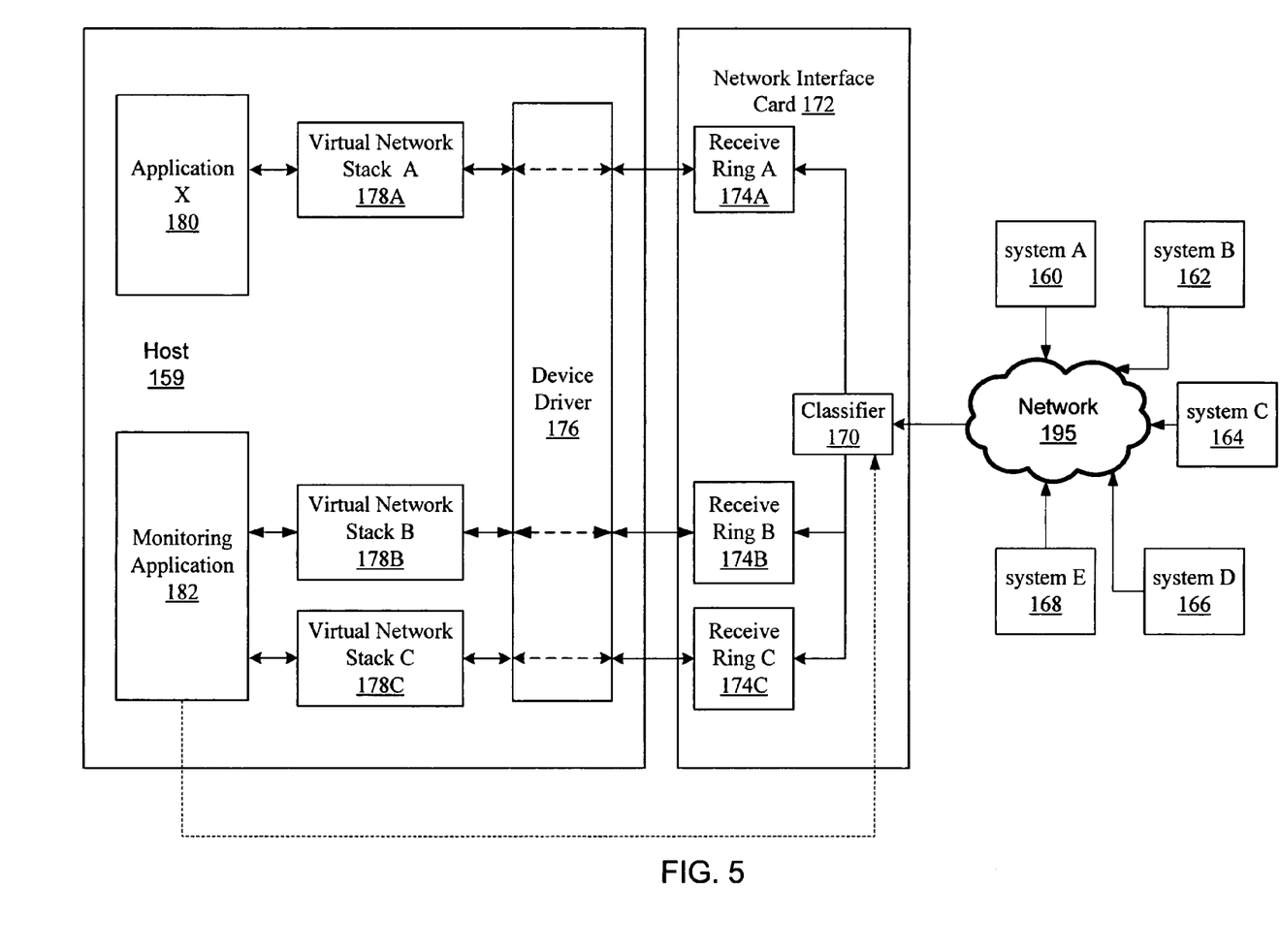
FIG. 5 shows a system in accordance with one embodiment of the present invention.

FIG. 5. shows an exemplary system after the steps in FIG. 4. have been performed in accordance with one embodiment of the invention. The exemplary system is not intended to limit the scope of the invention. The system shown in FIG. 5 includes five systems (System A (160), System B (162), System C (164), System D (166), and System E (168)) that a monitoring application (182) residing on a host (159) is monitoring. All systems as well as the host (159) are connected through a network (195). The host (159) is connected to the network (195) through the Network Interface Card (NIC) (172). The NIC (172) includes a Classifier (170) and one or more receive rings (Receive Ring A (174A), Receive Ring B (174B), Receive Ring C (174C)). The Classifier (170) is configured to analyze the incoming network traffic, typically in the form of packets, received from the network (195), and forward the packets to the appropriate receive ring (174A, 174B, 174C). Those skilled in the art will appreciate that the host (159) may be configured to intercept all traffic communicated on the network (195).

The Monitoring Application (182) is configured to program the Classifier (170). In this example, the Monitoring Application (182) may specify the following multiple monitoring profiles: all packets transmitted from system A (160) to system B (162), and all packets received by system C (164), for example, from any of system A (160), system B (162), system D (166), and system E (168). Further, the Monitoring Application (182) programs the Classifier (170) to forward all packets destined for system B (162) and originating from system A (160) to Receive Ring B (174B). Similarly, the Monitoring Application (182) programs the classifier (170) to forward all packets destined for system C (164), regardless of origin, to Receive Ring C (174C). All other packets not meeting the aforementioned criteria, are forwarded by the classifier (170) to Receive Ring A (174A). As shown in FIG. 5, the monitoring application (182) is configured to operate with virtual network stack B (178B) and virtual network stack C (178C). Virtual network stack B (178B) and virtual network stack C (178C) are associated with Receive Ring B (174 B) and Receive Ring C (174C), respectively. As shown in FIG. 5, application X (180) is configured to operate with virtual network stack A (178A), which is associated with Receive Ring A (174A).

All receive rings (174A, 174B, 174C) are configured to store a limited number of packets. Once a receive ring (174A, 174B, 174C) is "full" (i.e., no additional packets can be stored), the packets received after this point are dropped (i.e., not stored). In the example shown in FIG. 5, Receive Ring A (174A) has a lower priority status than Receive Ring B (174B), which in turn may have a lower priority status than Receive Ring C (174). Thus, packets will be removed from Receive Ring B (174B) and Receive Ring C (174C) by the corresponding the virtual network stack (178B, 178C) at rates faster than packets on Receive Ring A (174A) by virtual network stack A (178A). Further, once Receive Ring A (174A) becomes "full," no additional packets may be placed on Receive Ring A (174A).

Figure 6:
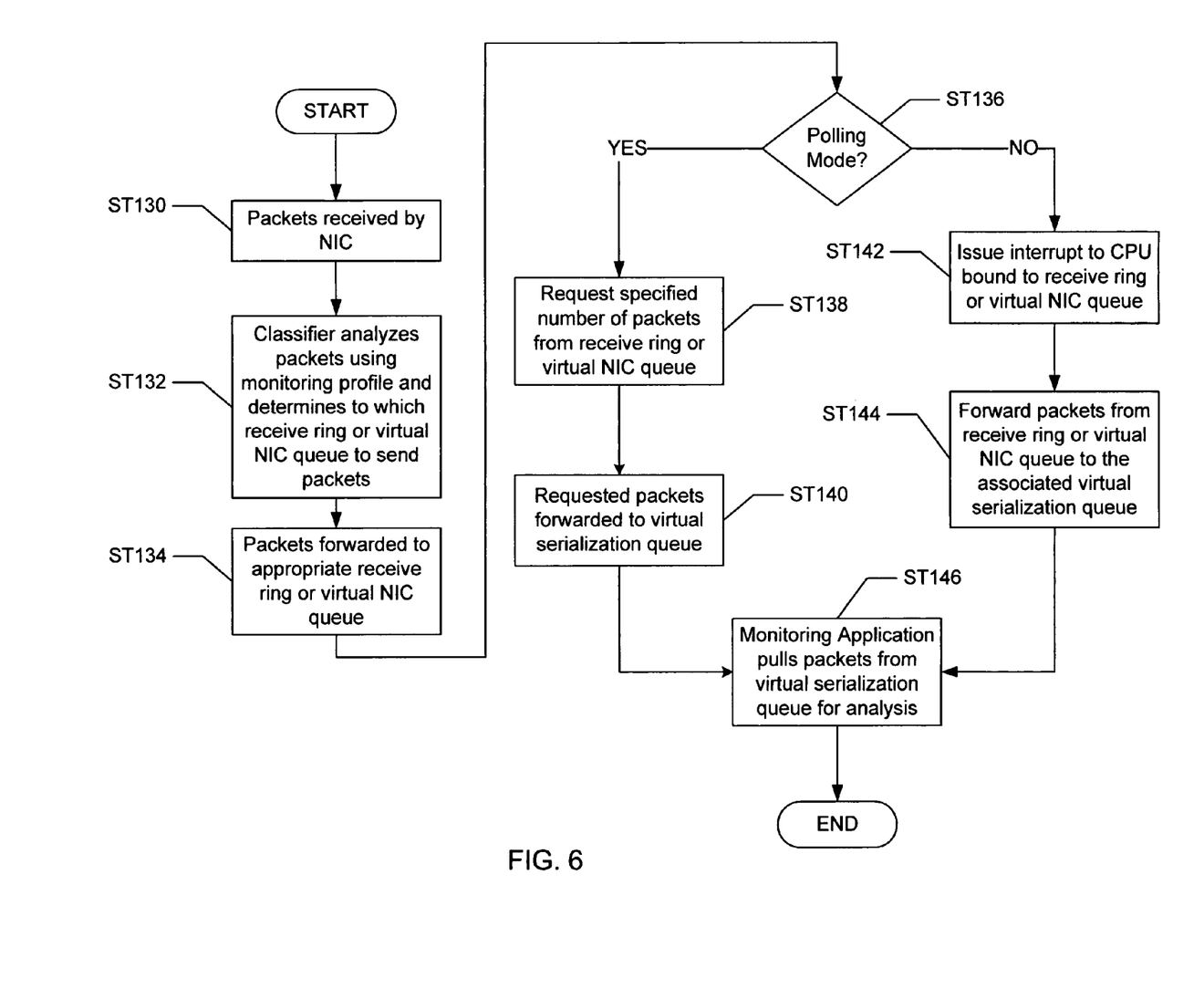
FIG. 6 shows a flowchart in accordance with one embodiment of the invention.

FIG. 6 shows a flowchart in accordance with one embodiment of the invention. Initially, one or more packets are received by the NIC (ST130). A classifier (either a hardware classifier residing in the NIC or a software classifier residing in the host operatively connected to the NIC) analyzes each packet using the aforementioned monitoring profile and determines which of the receive rings (if the classifier is a hardware classifier) or virtual NIC queues (if the classifier is a software classifier) to forward each of the packets (ST132). The packets are subsequently forwarded to the appropriate receive ring (if the classifier is a hardware classifier) or virtual NIC queue (if the classifier is a software classifier) as determined by the classifier (ST134). In one embodiment of the present invention, at least one receive ring (if the classifier is a hardware classifier) or virtual NIC queue (if the classifier is a software classifier) is designated to hold the desired packets to be monitored from the network. At this stage, the processing of the packets differs depending on which mode the virtual serialization queue (which is bound to the receive ring or virtual NIC queue via the stack) is operating. Specifically, the processing of the packets depends on whether the virtual serialization queue is operating in polling mode or interrupt mode (ST136).

If the virtual serialization queue is operating in polling mode, then the packets remain in the receive ring or virtual NIC queue (depending on the implementation) until the virtual serialization queue requests a specified number of packets from the receive ring or virtual NIC queue (ST138). The requested number of packets is then forwarded to the virtual serialization queue (ST140). In one embodiment of the invention, the virtual serialization queue does not request any packets when packets are already queued on the virtual serialization queue. Those skilled in the art will appreciate that the once the virtual serialization queue receives the packets from the receive ring or virtual NIC queue, the virtual serialization queue may place each of the packets in an appropriate sub-virtual serialization queue based on the results of the classifier analysis in ST132.

Those skilled in the art will appreciate in one embodiment of the present invention, all packets for the particular virtual serialization queue are forwarded from the receive ring or virtual NIC queue to the virtual serialization queue each time the virtual serialization queue requests packets from the receive ring or virtual NIC queue. Those skilled in the art will appreciate that the receive rings and/or virtual NIC queues store a finite number of packets. Thus, if the receive rings and/or virtual NIC queues receive packets faster than the corresponding virtual serialization queues request packets, the receive rings and/or virtual NIC queues may become filled with packets. Packets received after this point are dropped. Packets will continue to be dropped until packets are removed from the receive rings and/or virtual NIC queues.

Alternatively, if the virtual serialization queue is operating in interrupt mode, then an interrupt is issued to the CPU bound to the receive ring or virtual NIC queue (i.e., the CPU bound to the virtual serialization queue that is bound to the stack associated with the receive ring or virtual NIC queue) (ST142). When the interrupt is serviced, all packets in the receive ring or virtual NIC queue are forwarded to the virtual serialization queue (ST144).

Once the packets are placed on the virtual serialization queue, regardless of the mode in which the virtual serialization queue is operating, the packets are pulled and analyzed by the monitoring application running on the CPU bound to the particular virtual serialization queue (ST146). In one embodiment of the invention, the virtual serialization queues not associated with a monitoring application are placed in a low-priority receive ring (or virtual NIC queue). In one embodiment of the invention, virtual serialization queues associated with a monitoring application may be placed in different priority statuses. In one embodiment of the invention, the specific order in which the packets in a particular sub-virtual serialization queue are processed is determined by the packet scheduler.

Those skilled in the art will appreciate that if there is more than one distinct type of network traffic specified in the monitoring profile, then each of the distinct types of network traffic (or groups thereof) may be associated with separate virtual serialization queues, each of which may be assigned a distinct priority.

Figure 7:
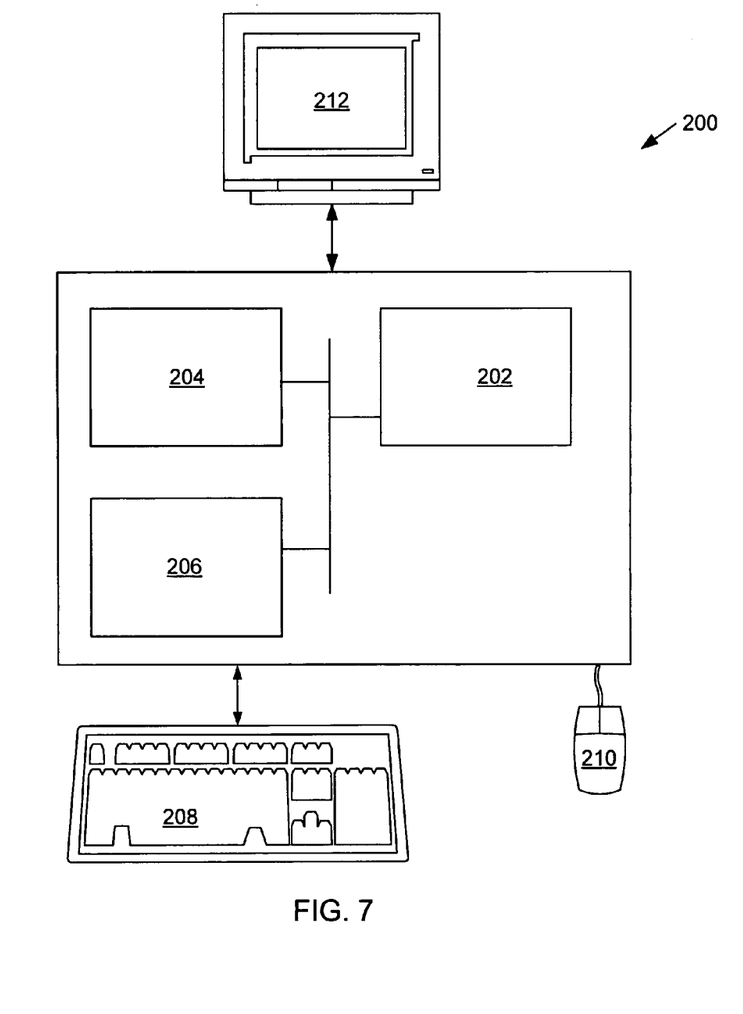
FIG. 7 shows a computer system in accordance with one embodiment of the invention.

An embodiment of the invention may be implemented on virtually any type of computer regardless of the platform being used. For example, as shown in FIG. 7, a networked computer system (200) includes a processor (202), associated memory (204), a storage device (206), and numerous other elements and functionalities typical of today's computers (not shown). The networked computer (200) may also include input means, such as a keyboard (208) and a mouse (210), and output means, such as a monitor (212). The networked computer system (200) is connected to a local area network (LAN) or a wide area network via a network interface connection (not shown). Those skilled in the art will appreciate that these input and output means may take other forms. Further, those skilled in the art will appreciate that one or more elements of the aforementioned computer (200) may be remotely located and connected to the other elements over a network. Further, software instructions to perform embodiments of the invention may be stored on a computer readable medium such as a compact disc (CD), a diskette, a tape, a file, or any other computer readable storage device.

Embodiments of the invention enable users to monitor packets exchanged between one or more sending systems and one or more receiving systems using a network with very heavy traffic.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for monitoring communication on a network comprising:
    configuring a classifier using a monitoring profile;
    receiving a plurality of packets from a network by a physical network interface card operatively connected to a host;
    analyzing each of the plurality of packets by the classifier to determine which of the plurality of packets satisfies the monitoring profile, wherein a packet satisfies the monitoring profile when the packet originates from a sending system specified in the monitoring profile, the packet is destined for a receiving system specified in the monitoring profile, and the packet is of a type specified in the monitoring profile;
    forwarding any of the plurality of packets that satisfy the monitoring profile to a first temporary data structure, wherein the first temporary data structure is associated with a first one of a plurality of virtual network interface cards and wherein each of the plurality of virtual network interface cards is associated with a different IP address;
    forwarding any of the plurality of packets that do not satisfy the monitoring profile to a second temporary data structure;
    requesting a first number of packets from the first temporary data structure by a first virtual serialization queue, wherein the first virtual serialization queue is associated with the first temporary data structure and the first one of the plurality of virtual network interface cards;
    forwarding the first number of packets to the first virtual serialization queue using a first virtual protocol stack; and
    analyzing packets in the first virtual serialization queue by a monitoring program located on the host, wherein the host comprises the plurality of virtual network interface cards,
    wherein the plurality of virtual network interface cards and the first virtual protocol stack share a common kernel and execute within a common operating system.

2. The method of claim 1, further comprising:
    requesting a second number of packets from the second temporary data structure by a second virtual serialization queue, wherein the second temporary data structure is associated with a second one of the plurality of virtual network interface cards, and wherein the second virtual serialization queue is associated with the second temporary data structure and the second one of the plurality of virtual network interface cards;
    forwarding the second number of packets to the second virtual serialization queue using a second virtual protocol stack; and
    analyzing packets in the second virtual serialization queue by the monitoring program,
    wherein the second virtual protocol stack shares the common kernel and executes within the common operating system.

3. The method of claim 1, further comprising:
    using a monitoring application to program the classifier using the monitoring profile.

4. The method of claim 1, wherein each of the plurality of temporary data structures comprises at least one selected from the group consisting of a virtual network interface card queue and a receive ring.

5. The method of claim 1, wherein the classifier is one selected from the group consisting of a hardware classifier and a software classifier.

6. The method of claim 1, wherein the first virtual serialization queue is associated with a first priority and the second virtualization queue is associated with a second priority, where the first priority is greater than the second priority.

7. A host, comprising:
    a physical network interface card configured to receive a plurality of packets from a network, wherein the physical network interface card is operatively connected to the host;
    a plurality of virtual network interface cards, wherein each one of the plurality of virtual network interface cards is associated with a different IP address, and wherein the plurality of virtual network interface cards is located on the host;
    a classifier operatively connected to the physical network interface card configured to analyze each of the plurality of packets using a monitoring profile and determine to which of a plurality of temporary data structures each of the plurality of packet is forwarded;
    a first one of the plurality of temporary data structures configured to receive packets from the classifier that satisfy the monitoring profile, wherein the first one of the plurality of temporary data structures is associated with a first virtual serialization queue and a first one of the plurality of virtual network interface cards, and wherein a packet satisfies the monitoring profile when the packet originates from a sending system specified in the monitoring profile, the packet is destined for a receiving system specified in the monitoring profile, and the packet is of a type specified in the monitoring profile;

a second one of the plurality of temporary data structures configured to receive packets from the classifier that do not satisfy the monitoring profile, wherein the second one of the plurality of temporary data structures is associated with a second virtual serialization queue;

the first virtual serialization queue configured to retrieve and queue a first number of packets using a first virtual protocol stack from the first one of the plurality of temporary data structures, wherein the first virtual serialization queue is associated with the first one of the plurality of temporary data structures and the first one of the plurality of virtual network interface cards; and a monitoring application associated with the first one virtual serialization queue configured to pull packets from the first virtual serialization queue for analysis, wherein the monitoring application is executing on the host, wherein the plurality of virtual network interface cards and the first virtual protocol stack share a common kernel and execute within a common operating system.

8. The system of claim 7, further comprising:

the second virtual serialization queue configured to retrieve and queue a second number of packets using a second virtual protocol stack from the second one of the plurality of temporary data structures, wherein the second virtual serialization queue is associated with the second one of the plurality of temporary data structures and the second one of the plurality of virtual network interface cards, wherein the second virtual protocol stack also shares the common kernel and executes within the common operating system.

9. The system of claim 8, wherein the first virtual serialization queue is associated with a first priority and the second virtualization queue is associated with a second priority, where the first priority is greater than the second priority.

10. The system of claim 7, wherein the monitoring application is configured to program the classifier using the monitoring profile.

11. The system of claim 7, wherein each of the plurality of temporary data structures comprises at least one selected from the group consisting of a virtual network interface card queue and a receive ring.

12. The system of claim 7, wherein the classifier is one selected from the group consisting of a hardware classifier and a software classifier.

13. The system of claim 7, wherein the virtual serialization queue comprises functionality to operate in polling mode and in interrupt mode.

14. A computer readable medium containing software instructions for monitoring communication on a network, wherein the software instructions comprise functionality to:

configure a classifier using a monitoring profile;

receive a plurality of packets from the network by a physical network interface card operatively connected to a host;

analyze each of the plurality of packets by the classifier to determine which of the plurality of packets satisfies the monitoring profile, wherein a packet satisfies the monitoring profile when the packet originates from a sending system specified in the monitoring profile, the packet is destined for a receiving system specified in the monitoring profile, and the packet is of a type specified in the monitoring profile;

forward any of the plurality of packets that satisfy the monitoring profile to a first temporary data structure, wherein the first temporary data structure is associated with one of a plurality of virtual network interface cards and wherein each of the plurality of virtual network interface cards is associated with a different IP address;

forward any of the plurality of packets that do not satisfy the monitoring profile to a second temporary data structure;

request a first number of packets from the first temporary data structure by a first virtual serialization queue, wherein the first virtual serialization queue is associated with the first temporary data structure and the one of the plurality of virtual network interface cards;

forward the first number of packets to the first virtual serialization queue; and analyze packets in the first virtual serialization queue by a monitoring program located on the host, wherein the host comprises the plurality of virtual network interface cards, wherein the plurality of virtual network interface cards and the first virtual protocol stack share a common kernel and execute within a common operating system.

15. The method of claim 1, wherein the monitoring program executes at an application level on the host.

* * * * *